(12) United States Patent
Kiessling et al.

(10) Patent No.: US 6,901,251 B1
(45) Date of Patent: May 31, 2005

(54) PORTABLE COMMUNICATION APPARATUS HAVING A MAN-MACHINE INTERFACE AND A METHOD FOR ITS OPERATION

(76) Inventors: Johan Kiessling, Rödabergsbrinken 16, S-113 30 Stockholm (SE); Jan Arwald, Drevkarlstigen 1, S-192 53 Stockholm (SE); Bernt Nilsson, Ölmegatan 3A, S-652 30 Karlstad (SE); Benny Saxen, Krykvardsvägen 32, S-665 33 Kil (SE)

( * ) Notice: Subject to any disclaimer, the term of this patent is extended or adjusted under 35 U.S.C. 154(b) by 433 days.

(21) Appl. No.: 09/676,800

(22) Filed: Sep. 29, 2000

(30) Foreign Application Priority Data

Oct. 1, 1999 (SE) ............................................... 9903560
May 26, 2000 (SE) ............................................... 0001996

(51) Int. Cl.⁷ ................................................. H04B 1/00
(52) U.S. Cl. ....................... 455/410; 455/566; 455/420; 455/414.2; 705/44; 380/247
(58) Field of Search ................................ 455/410, 411, 455/414.2, 414.1, 415, 419, 556, 558, 414.3; 380/247, 248, 249; 705/42, 43, 44

(56) References Cited

U.S. PATENT DOCUMENTS

| 5,991,618 | A | * | 11/1999 | Hall ........................... 455/425 |
| 6,018,724 | A | * | 1/2000 | Arent .......................... 705/44 |
| 6,216,014 | B1 | * | 4/2001 | Proust et al. .............. 455/558 |
| 6,249,584 | B1 | * | 6/2001 | Hamalainen et al. ....... 380/270 |
| 6,356,753 | B1 | * | 3/2002 | Kolev et al. ................ 455/411 |
| 6,367,014 | B1 | * | 4/2002 | Proust et al. ............... 713/182 |
| 6,384,850 | B1 | * | 5/2002 | McNally et al. ............ 345/810 |
| 6,412,021 | B1 | * | 6/2002 | Nguyen et al. ............. 709/318 |
| 6,418,326 | B1 | * | 7/2002 | Heinonen et al. .......... 455/558 |
| 6,466,783 | B2 | * | 10/2002 | Dahm et al. ............. 455/414.2 |
| 6,512,923 | B2 | * | 1/2003 | Pallas et al. ............. 455/435.1 |

FOREIGN PATENT DOCUMENTS

EP 1 054 543 A2 11/2000

* cited by examiner

*Primary Examiner*—Nick Corsaro
(74) *Attorney, Agent, or Firm*—Potomac Patent Group PLLC

(57) ABSTRACT

A portable communication apparatus has a man-machine interface, a controller, an operating system, a local storage device for storing a first application, a secure resource which is only accessible from the operating system, and a wireless interface for connecting the portable communication apparatus to a remote device. The man-machine interface provides interaction between a user of the portable communication apparatus and the first application when the first application is executed by the controller and the operating system. The man-machine interface also provides interaction between the user and a second application originating from the remote device. Only the operating system can provide a security indicator through the man-machine interface. The security indicator indicates a secure connection between the secure resource and either the first application or the second application, whichever is interacting with the man-machine interface.

17 Claims, 4 Drawing Sheets

Figure 1:
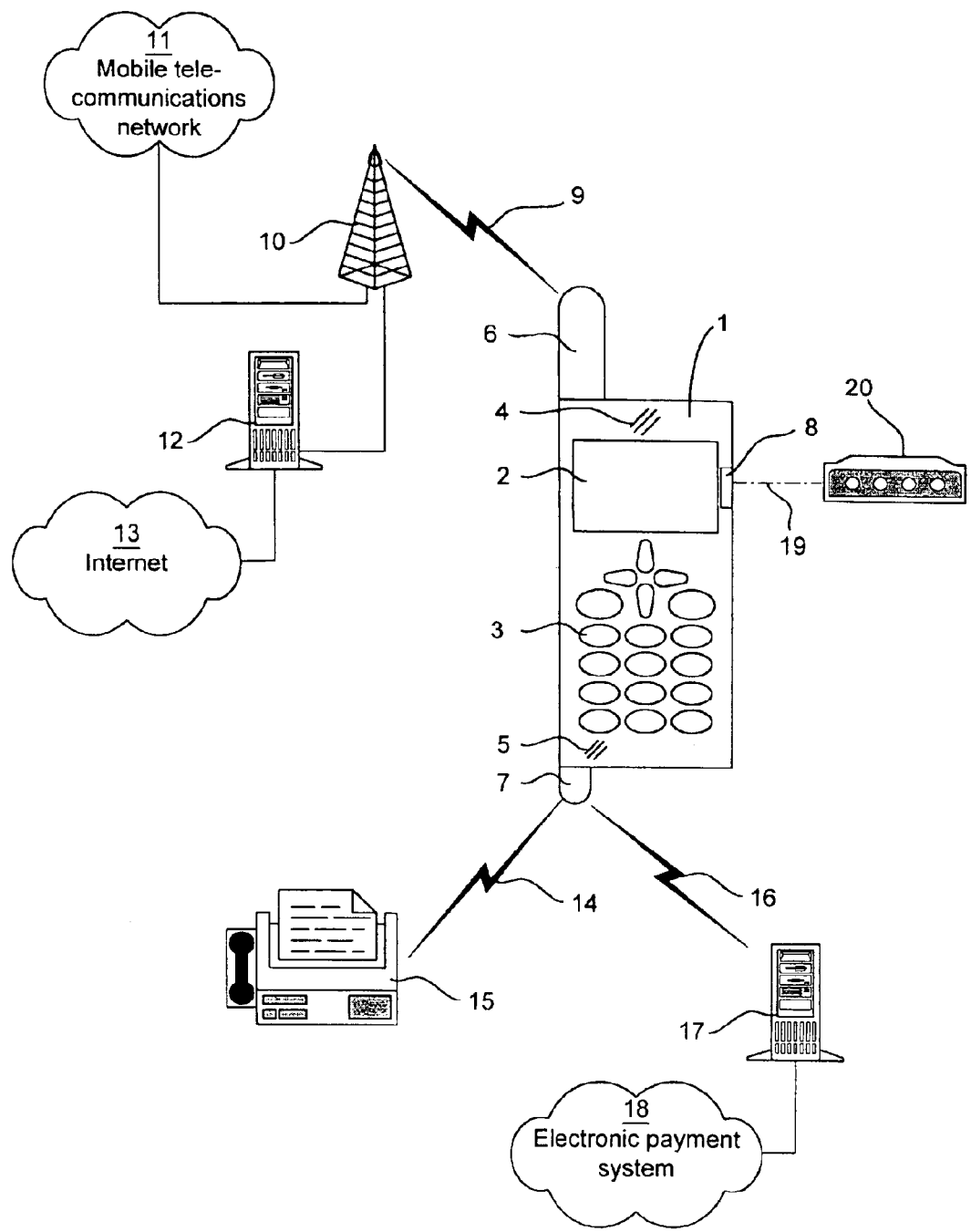

PORTABLE COMMUNICATION APPARATUS HAVING A MAN-MACHINE INTERFACE AND A METHOD FOR ITS OPERATION

This application claims priority under 35 U.S.C. §§119 and/or 365 to 9903560-2 filed in Sweden on Oct. 1, 1999 and 0001996-8 filed in Sweden on May 26, 2000; the entire content of which is hereby incorporated by reference.

BACKGROUND

Generally speaking, the present invention relates to a portable communication apparatus for providing communication services to a user through a man-machine interface of the apparatus. More specifically, the invention relates to a portable communication apparatus of the type having a controller, an operating system, a local storage device for storing a first application, a secure resource which is only accessible from the operation system, and wireless interface for connecting the portable communication apparatus to a remote device.

Examples of a portable communication apparatus as set out above are a mobile telephone, a cordless telephone, a portable digital assistant, a communicator, a paging device, an electronic payment device, or a portable navigating device. For the rest of this document, reference will be made to a mobile telephone for any mobile communications network such as GSM, EDGE or UMTS. However, the invention is not limited to merely a mobile telephone. On the contrary, the invention is best defined by the appended independent claims.

Traditionally, older mobile telephones were only capable of providing speech communication between two human users through a mobile communications network and, in many situations, a public switched telephone network. More recently, mobile telephones have been provided with additional functionality, such as capability of providing data or facsimile communication between the portable communication apparatus and another electronic device. Moreover, such telephones often contain simple utility applications, such as a built-in electronic telephone book, a calculator, an alarm function or a video game.

Even more recently, numerous advanced additional utility applications have been introduced for mobile telephones. Such advanced utility applications include short-range supplementary data communication between the mobile telephone and for instance a portable computer, a printer, a wireless headset accessory, etc. One example of such short-range supplementary data communication facilities is commonly referred to as Bluetooth and operates in a 2.4 GHz frequency band, which is often referred to as ISM ("Instrumental, Scientific and Medical").

Other examples of advanced utility applications are wireless electronic payment ("electronic wallet"), smartcard applications (such as SIM Toolkit applications), wireless access to global networks (such as WAP-"Wireless Application Protocol" for accessing resources on the Internet), etc.

Consequently, a mobile telephone of today, and certainly in the future, will host a number of applications, which share common resources of the mobile telephone. The commonly shared resources will include the man-machine interface, particularly a display of the mobile telephone, but also secure or private resources, such as information stored in a SIM card ("Subscriber Identification Module") or another memory in the mobile telephone. These applications will be executed in different environments within the mobile telephone, for instance in a WAP/Java/HTML ("Hyper Text Markup Language") browser, a processor on the SIM card or another type of smartcard, directly in the operating system of the mobile telephone, etc. Moreover, some applications may be executed outside the mobile telephone in an external device connected to the telephone. Furthermore, applications may be downloaded to the mobile telephone after the manufacturing thereof.

Many of these applications may be activated or launched by events occurring without reach of the user's immediate control or attention. In most cases the applications will communicate with the user through the man-machine interface of the mobile telephone, particularly its display. Due to the limited size of the display, an active application will often have full control of the entire display. When another application is activated, it may then take over the control of the display and other parts of the man-machine interface, such as the keyboard of the mobile telephone. Sudden switches between such applications running in different environments inside the mobile telephone or in an external device will be difficult for the user to notice, understand and handle correctly. Consequently, it will be hard for the user to realize that an application from a different origin, of a different type or in a different environment is now suddenly in control of the man-machine interface.

Moreover, an application running in a low-security environment could impersonate an application running in a high-security environment. For instance, a WAP application could pretend to be a SIM/smartcard-based application. Similarly, an external application could pretend to be an application within the mobile telephone.

The above is of particular concern, if the user uses the mobile telephone to perform some kind of secure transaction on behalf of him/her based on secure resources in the mobile telephone. For instance, if the mobile telephone is used as a wireless electronic payment device, it is utterly important for the user to know, without any doubt, what type of application that he/she is currently communicating with through the man-machine interface, that the active application is trustworthy, and that the application is communicating securely and directly with the secure resources of the mobile telephone and the man-machine interface thereof without any risk of another application interfering with, modifying or capturing any secure data involved in the communication.

Unfortunately, in most existing utility application environments for mobile telephones, the security issues are only optional but not mandatory. For instance, security features like WTLS ("Wireless Transport Layer Security") are only optional in WAP 1.1 and 1.2 and also WIM ("Wireless Identity Module").

Moreover, short-range supplementary data applications (such as Bluetooth) may be activated through suddenly established links, if the user carries the mobile telephone in a vicinity of a remote device capable of such communication.

In view of the above, when it comes to advanced utility applications, the only existing safe alternative for a user of a mobile telephone according to the above is to verify the mobile telephone itself as well as its implementation of optional parts of the communication standards involved, the SIM-card/smartcard provided by the telephone operator and, finally, the security of each individual node in the communication link between the mobile telephone and a remote device.

SUMMARY

It is an object of the present invention to provide a substantial improvement of the above situation, with particular focus on keeping the user aware of the momentary security situation in the application environment of the mobile telephone.

The above object has been achieved, according to the invention, by the provision of a security indicator, which only the operating system of the mobile telephone is capable of indicating to the user through the man-machine interface of the telephone. The security indicator, which preferably is provided visually on the display of the telephone, but which alternatively may be provided as an audible or tactile signal, provides the user with certain information regarding the security of the connection between a secure resource in the mobile telephone and an active application, which is either executed internally in the telephone or is executed in a remote device connected to the telephone. In both cases, the active application will use the man-machine interface of the mobile telephone. The security indicator may also indicate a type, origin or certificate of the active application. Moreover, it may indicate the location of execution for the active application.

The solution to the above object is best defined by the appended independent patent claims. Other objects, features and advantages will appear from the following detailed disclosure, from the sub claims as well as from the accompanying drawings.

BRIEF DESCRIPTIONS OF THE DRAWINGS

Figure 2:
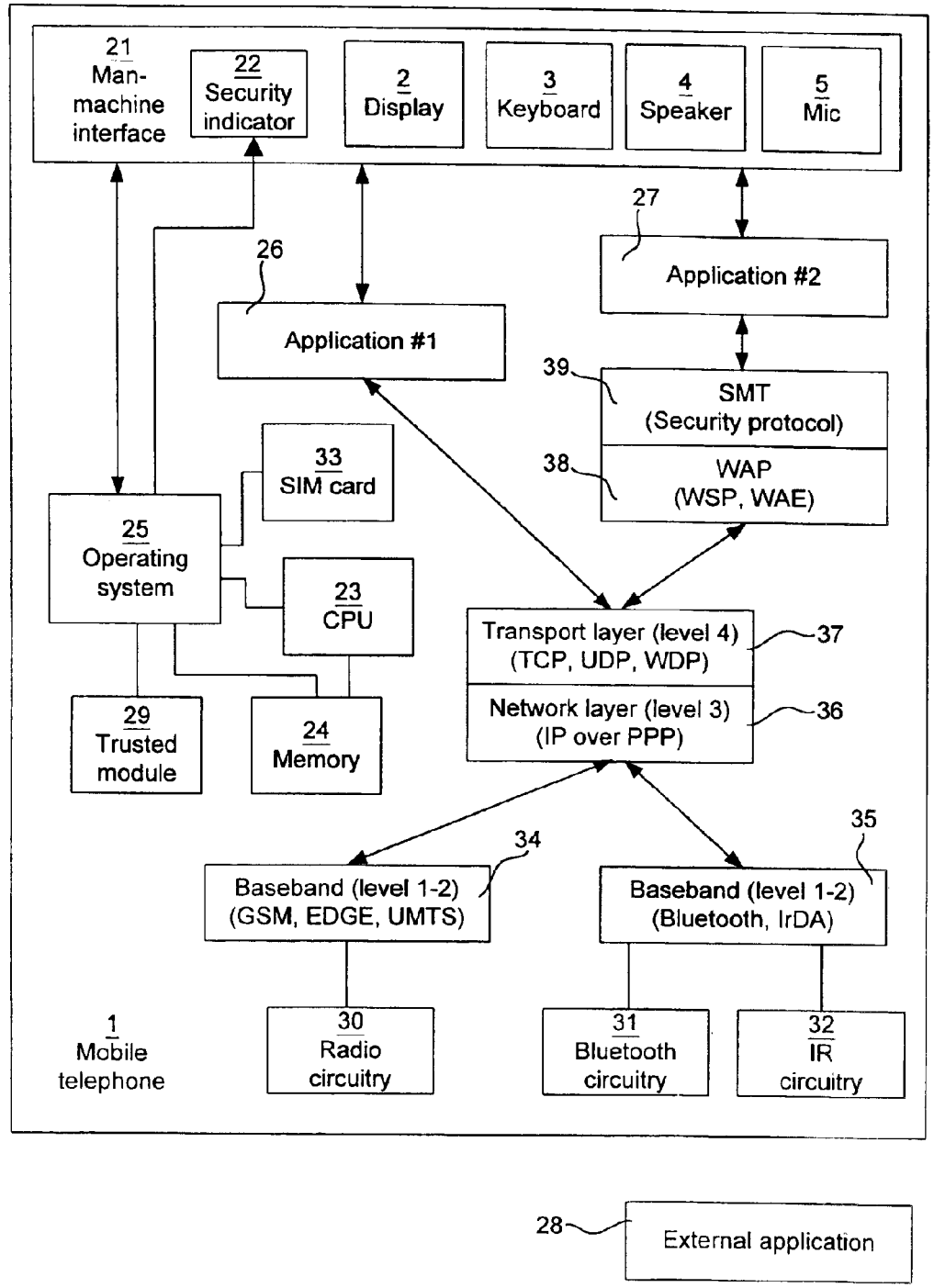

Preferred and alternative embodiments of the present invention will now be described in more detail, reference being made to the accompanying drawings, in which:

FIG. 1 is a schematic block diagram of a portable communication apparatus and a utility application environment, in which it may operate, FIG. 2 is a block diagram of the portable communication apparatus shown in FIG. 1, and FIGS. 3, 4a–4b, 5a–5c, 6 and 7 illustrate a part of a man-machine interface of the portable communication apparatus according to different embodiments.

DETAILED DESCRIPTION

Reference is first made to FIG. 1, which illustrates a portable communication apparatus in the form of a mobile telephone 1, as well as the environment in which it operates. In a normal fashion, the mobile telephone 1 comprises a display 2, a keyboard 3, a loudspeaker 4, and a microphone 5. The components 2–5 together form a man-machine interface, through which a user of the mobile telephone 1 may interact with and operate the mobile telephone. Moreover, the mobile telephone 1 comprises a first antenna 6 for establishing a wireless connection 9 to a mobile telecommunications network 11 through a base station 10. The mobile telecommunications network 11 may be a GSM network ("Global System for Mobile communications"), EDGE ("Enhanced Data Rates for GSM Evolution") or UMTS ("Universal Mobile Telephone System"). The mobile telephone 1 may also be used for accessing a global information network 13, through a gateway 12, over the wireless link 9. The global information network 13 may preferably be the Internet, and the gateway 12 may be a WAP server.

The mobile telephone 1 also comprises a second antenna 7, which may be used for establishing a short-range supplementary data connection 14 to a remote device 15. The link 14 may preferably be a Bluetooth link, as described in previous sections of this document. The remote device 15 may e.g. be a printer, a facsimile device, a cordless telephone accessory (such as a head set), a computer (e.g. a stationary desktop computer or a portable laptop computer), but many other devices are also possible.

The second antenna 7 may also be used for establishing a short-range supplementary data connection 16 to an electronic payment system 18 through a gateway 17.

In addition to the above, the mobile telephone 1 further comprises an IR (infrared) interface 8, by means of which the mobile telephone 1 may establish an IR link 19 to a remote device 20. The remote device 20 may e.g. be a computer (stationary, laptop or pocket), a modem, a printer, etc.

In FIG. 2 the mobile telephone 1 of FIG. 1 is shown i more detail. As previously mentioned, the telephone 1 comprises a man-machine interface 21, including the display 2, the keyboard 3, the loudspeaker 4 and the microphone 5. A central processing unit (CPU) 23 is responsible for the overall control of the mobile telephone 1 together with a memory 24 and an operating system 25. The central processing unit 23 may be implemented by any commercially available microprocessor or another type of programmable electronic circuitry. The memory 24 may be implemented as a random-access memory (RAM), a read-only memory (ROM), an erasable programmable read-only memory (EPROM, EEPROM), a flash memory, or any combination of such memories. Preferably, the operating system 25 is stored in a part of the memory 24.

The mobile telephone 1 also has a SIM module 33, preferably in the form of a smart card in which there is stored private data regarding a mobile telephony subscription for the mobile telecommunications network 11. The SIM card 33 may also comprise one or a plurality of SIM Toolkit applications.

The mobile telephone 1 also has radio circuitry 30, which will be used in combination with the first antenna 6 for establishing the wireless link 9 of FIG. 1. Similarly, the mobile telephone 1 comprises circuitry 31 for short-range supplementary data connectivity, to be used for establishing the links 14 or 16 through the second antenna 7 of FIG. 1. The circuitry 31 may e.g. be adapted for Bluetooth communication. Additionally, the mobile telephone comprises IR circuitry 32, to be used for establishing an infrared link 19 to the remote device 20 shown in FIG. 1. The IR circuitry 32 may preferably be adapted for IrDA communication. The radio circuitry 30, the short-range supplementary data circuitry 31 and the IR circuitry 32 are all already commercially available, form no central part of the present invention and are therefore not described in any detail herein.

Indicated in FIG. 2 is also a trusted module 29, which may involve private keys, secret data, etc., for use together with a WIM module ("Wireless Identity Module"), which is used in WAP applications. The trusted module 29 may also relate to a SWIM module, e.g. a WIM module implemented on the SIM card 33. In some embodiments, the trusted module 29 may be stored in the memory 24.

FIG. 2 also contains an indication of a protocol structure used for the different wireless links 9, 14, 16, and 19 of FIG. 1. The protocol structure essentially follows the well-known seven-layer OSI structure. At the bottom of the protocol structure there is provided first and second baseband layers 34 for the wireless link 9 to the mobile telecommunications network 11 and the global network (Internet) 13. Moreover, there is provided corresponding first and second baseband layers 35 for the Bluetooth circuitry 31 and the IR circuitry 32.

Next, on a third level, there is provided a network layer, such as IP over PPP ("Internet Protocol", "Peer to Peer Protocol"). A transport layer 37 is provided on level 4. The transport layer may e.g. be TCP ("Transport Control Protocol"), UDP ("User Datagram Protocol") or WDP ("Wireless Datagram Protocol").

On layer 5 there is provided a WAP session layer 38, comprising e.g. WSP ("Wireless Session Protocol") or WAE ("Wireless Application Environment"). All protocols, which have been mentioned with respect to the layers 34, 35, 36, 37 and 38 above, are all believed to be well-known in the technical field and are not described in any detail herein.

At a sixth level there is provided a security protocol 39, e.g. SMT ("Secure Mobile Transaction"). SMT is a security protocol on an application level, which addresses limitations in communication with a mobile personal device. Currently SMT is under development and is therefore not yet a standard.

The protocol structure described above is capable of serving a plurality of applications, which are executed in different environments inside and outside the mobile telephone 1. Consequently, a first application 26 may communicate directly with the transport layer 37 and the man-machine interface 21. The application 26 is preferably stored in the memory 24 and is executed by the central processing unit 23 under the operating system 25. Additionally, a second application 27 may communicate with the WAP layer 38 or the security layer 39 and the man-machine interface 21. Correspondingly, the application 27 may be stored in the memory 24 and be executed by the central processing unit 23 under the operating system 25. Alternatively, the applications 26 and/or 27 may be stored in the SIM-card 33 or the trusted module 29.

The mobile telephone 1 is also capable of serving an external application 28, which is located in a remote device. Such a remote device may e.g. be any of the devices 11, 12, 13, 15, 17, 18 or 20 indicated in FIG. 1. Such an external application 28 will communicate with the mobile telephone 1 over any of the wireless links 9, 14, 16, or 19 (i.e., radio, short-range supplementary data or infrared). The user will interact with the external application 28 through the man-machine interface 21 of the mobile telephone 21.

Figure 3:
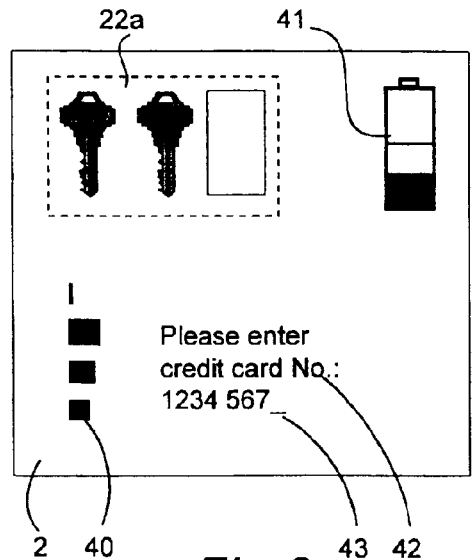
Figure 4A:
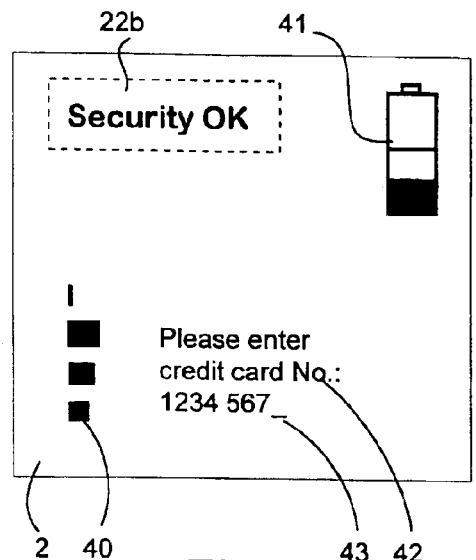
Figure 4B:
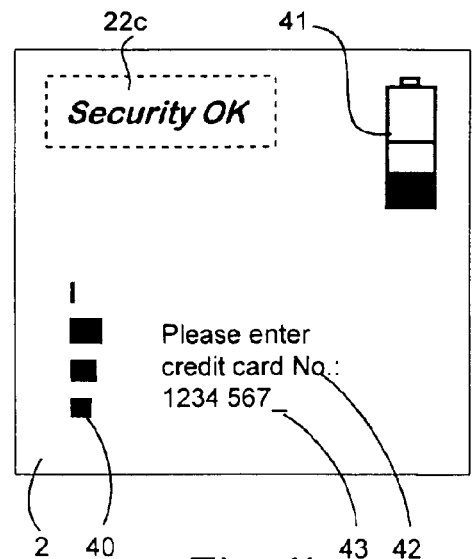

In order to solve the above-mentioned object of the invention, the mobile telephone is provided with a security indicator 22, which is part of the man-machine interface 1, and which is only controllable from the operating system 25. More particularly, an application 26, 27, 28 may only affect the security indicator 22 through certain operating system calls to the operating system 25. Thus, no application may modify the security indicator 22 without the cooperation and consent of the operating system 25. According to different embodiments of the invention, the security indicator 22 comprises one or more than one special graphical icon (22a in FIG. 3), which preferably resides in a separate portion of the display 2 and which may only be updated by the operating system 25 through aforesaid operating system calls. Alternatively, the security indicator may be provided as a special alpha numeric character or as a special text message (22b in FIG. 4a), having a special font (22c in FIG. 4b) size or color different from normal text messages (42 and 43 in FIG. 3) presented on the display 2. Icons 40 and 41 in FIG. 3 are conventional indicators for signal strength and battery capacity, respectively.

As an alternative to the above types of security indicator, the security indicator 22 may be provided as an audible signal through the loudspeaker 4 of the mobile telephone 1. As yet another alternative, the security indicator may be provided as a tactile signal (preferably a vibrating signal) generated by other means in the mobile telephone 1.

Figure 5A:
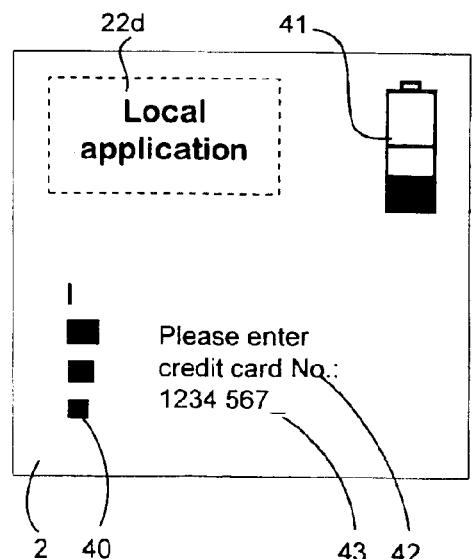
Figure 5B:
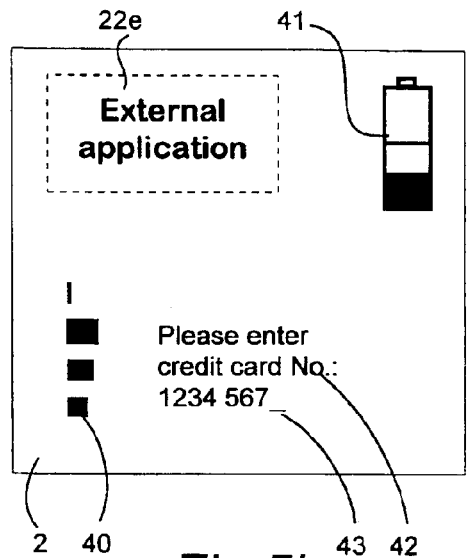
Figure 5C:
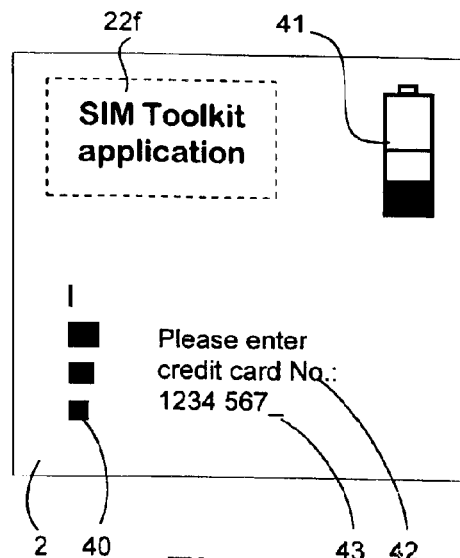

The purpose of the security indicator 22 is to provide information to the user about a current level of security as regards an active application currently communicating with the user through the man-machine interface 21. Since the security indicator 22 may be controlled only from the operating system 25, the user may rely on the information provided by the security indicator. According to one embodiment, the security indicator may indicate a type, security level, or origin of an active application, which the user is currently communicating with through the man-machine interface 21. For instance, as shown in FIG. 5a, the security indicator 22d may indicate that the active application is local (stored and executed within the mobile telephone 1). Correspondingly, an external application stored and/or executed in a remote device outside the telephone 1 may be indicated through the security indicator 22e (FIG. 5b). As shown in FIG. 5c, the security indicator 22f may indicate a more detailed type of the active application, e.g. that it is a SIM Toolkit application. The security indicator may also indicate that the active application runs in a WAP/Java/HTML browser.

Figure 6:
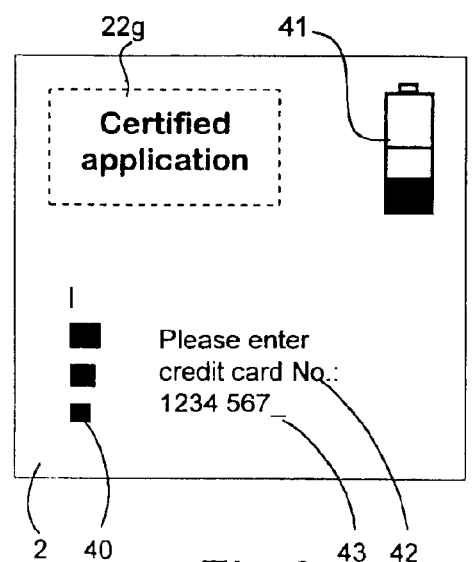
Figure 7:
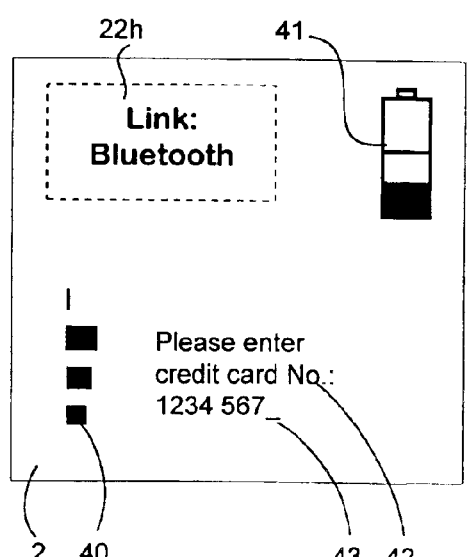

Alternatively, the security indicator 22g may indicate that the active application is certified in some way (FIG. 6). The security indicator may also indicate a switch from a previously active application to a currently active application.

According to some embodiments, the security indicator may indicate whether the active application was provided in the mobile telephone 1 already at the manufacture thereof, or whether the active application has been downloaded to the telephone 1 at a later time.

If the currently active application is an external application, the security indicator 22 may represent the level of security of the link between the mobile telephone 1 and the remote device, where the external application resides. The level of security may then advantageously be indicated graphically as indicated by the icon 22a in FIG. 3. Three key symbols in the icon 22a represent a high-level security, whereas two key symbols represent a medium-level security, only one key symbol represents a low-level security and, finally, no key symbol at all represents no security.

The security indicator (22h in FIG. 7) may also provide an indication about a type of a link between the mobile telephone 1 and a remote device, such as a Bluetooth link (14, 16), an infrared link (19), or a radio link (9).

Moreover, the security indicator 22 may indicate that a transaction currently performed by the active application is atomic in the sense that the transaction cannot be interrupted, manipulated or interpreted by any other application than the active application. The security indicator 22 could also indicate important parameters of such a secure transaction, such as key length for a used encryption method, etc.

In addition to the above, the security indicator 22 may indicate if any of the wireless links 9, 14, 16 or 19 is currently established, a status thereof, or a physical quality (signal strength, etc.) of such an established link.

To summarize the above, in its general form, the present invention provides a security indicator through the man-machine interface of a portable communication apparatus, wherein the security indicator represents a security of a connection between a secure resource of the portable communication apparatus and an active application, which is currently using the man-machine interface. The term secure resource is to be interpreted broadly and covers inter alia, a certain part of the mobile telephone 1 (e.g. its man-machine interface 21), private keys or other secure data stored in the mobile telephone, e.g. in the trusted module 29, the memory 24 or the SIM-card 33.

The present invention has been described above with reference to some embodiments. However, other embodiments than the ones referred to above are equally possible within the scope of invention, which is best defined by the appended independent claims.

What is claimed is:

1. A portable communication apparatus comprising:

a man-machine interface having a display;

a controller;

an operating system;

a local storage device for storing a first application, wherein the man-machine interface is adapted to provide interaction between a user of the portable communication apparatus and the first application when executed by the controller and the operating system;

a wireless interface for connecting the portable communication apparatus to a remote device, wherein the man-machine interface is also adapted to provide interaction between the user and a second application originating from the remote device; and a secure resource which is only accessible from the operating system, wherein only the operating system is adapted to provide a security indicator through the man-machine interface at a dedicated sub-portion of the display only accessible to the operating system, the security indicator representing a secure connection between the secure resource and one of the first and second applications currently using the man-machine interface.

2. The apparatus of claim 1, wherein the security indicator indicates one of a type, origin, and certificate of one of the first and second applications currently using the man-machine interface.

3. The apparatus of claim 1, wherein the security indicator is presented on a display of the portable communication apparatus.

4. The apparatus of claim 3, wherein the security indicator comprises at least one predetermined icon.

5. The apparatus of claim 3, wherein the security indicator comprises a predetermined text message.

6. The apparatus of claim 5, wherein the predetermined text message has one of a font, size, and color different from other text messages presented on the display.

7. The apparatus of claim 3, wherein the security indicator indicates whether one of the first and second applications currently using the man-machine interface is executed locally in the portable communication apparatus or is executed externally to the portable communication apparatus.

8. The apparatus of claim 3, wherein the security indicator indicates whether one of the first and second applications currently using the man-machine interface was originally stored in the local storage device when the portable communication apparatus was manufactured or originates from the remote device.

9. The apparatus according of claim 1, wherein the security indicator comprises an indication of a type of a connection between the portable communication apparatus and the remote device.

10. The apparatus of claim 9, wherein the connection is a short-range supplementary data connection.

11. The apparatus of claim 1, wherein the security indicator comprises an audible signal through the man-machine interface.

12. The apparatus of claim 1, wherein the security indicator comprises a tactile signal through the mar-machine interface.

13. The apparatus of claim 1, wherein the apparatus is capable of mobile telecommunication.

14. The apparatus of claim 1, wherein the security indicator comprises an indication of whether there is currently a link between the portable communication apparatus and a remote device.

15. The apparatus of claim 1, wherein the security indicator comprises an indication of a physical link quality of the secure connection.

16. The apparatus of claim 1, wherein the security indicator comprises an indication that a transaction over the secure connection cannot be interrupted, manipulated, or interpreted by an application other than the one of the first and second applications currently using the man-machine interface.

17. A method of operating a man-machine interface having a display of a portable communication apparatus of the type having an operating system capable of executing a plurality of applications through the man-machine interface, the method comprising the steps of:

providing a security indicating feature in the man-machine interface at a dedicated sub-portion of the display only accessible to the operating system;

providing an operating system call for invoking the security indicating feature from at least one of the plurality of applications;

providing information regarding a security of one of the plurality of applications currently using the man-machine interface, upon reception of the operating system call from the one of the plurality of applications; and including the information in the security indicating feature.

* * * * *